US011467579B2

(12) United States Patent
Maat et al.

(10) Patent No.: US 11,467,579 B2
(45) Date of Patent: Oct. 11, 2022

(54) PROBABILISTIC NEURAL NETWORK FOR PREDICTING HIDDEN CONTEXT OF TRAFFIC ENTITIES FOR AUTONOMOUS VEHICLES

(71) Applicant: Perceptive Automata, Inc., Boston, MA (US)

(72) Inventors: Jacob Reinier Maat, Boston, MA (US); Samuel English Anthony, Somerville, MA (US)

(73) Assignee: Perceptive Automata, Inc., Boston, MA (US)

( * ) Notice: Subject to any disclaimer, the term of this patent is extended or adjusted under 35 U.S.C. 154(b) by 299 days.

(21) Appl. No.: 16/783,845

(22) Filed: Feb. 6, 2020

(65) Prior Publication Data

US 2020/0249677 A1 Aug. 6, 2020

Related U.S. Application Data

(60) Provisional application No. 62/822,269, filed on Mar. 22, 2019, provisional application No. 62/802,151, filed on Feb. 6, 2019.

(51) Int. Cl.
*G05D 1/00* (2006.01)
*G06N 7/00* (2006.01)
(Continued)

(52) U.S. Cl.
CPC .......... *G05D 1/0088* (2013.01); *B60W 60/001* (2020.02); *G05D 1/0212* (2013.01);
(Continued)

(58) Field of Classification Search
CPC .. G05D 1/0088; G05D 1/0212; G05D 1/0231; B60W 60/001; B60W 2420/42;
(Continued)

(56) References Cited

U.S. PATENT DOCUMENTS 7,269,516 B2 * 9/2007 Brunner ................. G16H 15/00
382/128
8,175,333 B2 * 5/2012 Eaton ...................... G06F 15/16
382/103
(Continued)

OTHER PUBLICATIONS

International Search Report and Written Opinion, Patent Cooperation Treaty Application No. PCT/US2020/15889, dated Jun. 16, 2020, 23 pages.
(Continued)

*Primary Examiner* — Thomas Ingram
(74) *Attorney, Agent, or Firm* — Fenwick & West LLP

(57) ABSTRACT

An autonomous vehicle uses probabilistic neural networks to predict hidden context attributes associated with traffic entities. The hidden context represents behavior of the traffic entities in the traffic. The probabilistic neural network is configured to receive an image of traffic as input and generate output representing hidden context for a traffic entity displayed in the image. The system executes the probabilistic neural network to generate output representing hidden context for traffic entities encountered while navigating through traffic. The system determines a measure of uncertainty for the output values. The autonomous vehicle uses the measure of uncertainty generated by the probabilistic neural network during navigation.

20 Claims, 11 Drawing Sheets

(51) Int. Cl.
*G06N 3/08* (2006.01)
*G05D 1/02* (2020.01)
*B60W 60/00* (2020.01)

(52) U.S. Cl.
CPC ............. *G05D 1/0231* (2013.01); *G06N 3/08* (2013.01); *G06N 7/005* (2013.01); *B60W 2420/42* (2013.01)

(58) Field of Classification Search
CPC ..... B60W 2554/4042; B60W 2754/20; B60W 2754/30; G06N 3/08; G06N 7/005; G06N 5/003; G06N 20/10; G06N 20/20; G06N 3/0445; G06N 3/0454; G06N 3/084; G06N 3/0472

See application file for complete search history.

(56) References Cited

U.S. PATENT DOCUMENTS

| | | |
|---|---|---|
| 9,415,777 B2 | 8/2016 | Clarke et al. |
| 9,766,336 B2 | 9/2017 | Gupta et al. |
| 2011/0210866 A1 | 9/2011 | David et al. |
| 2015/0210280 A1 | 7/2015 | Agnew et al. |
| 2016/0355181 A1 | 12/2016 | Morales Teraoka et al. |
| 2017/0131719 A1 | 5/2017 | Micks et al. |
| 2017/0153639 A1 | 6/2017 | Stein |
| 2017/0318360 A1 | 11/2017 | Tran et al. |
| 2017/0329332 A1 | 11/2017 | Pilarski et al. |
| 2018/0374359 A1 | 12/2018 | Li et al. |
| 2019/0012574 A1* | 1/2019 | Anthony ................ G06V 20/58 |
| 2019/0107840 A1 | 4/2019 | Green et al. |
| 2019/0122037 A1 | 4/2019 | Russell et al. |
| 2019/0187720 A1 | 6/2019 | Fowe |
| 2019/0359205 A1 | 11/2019 | Xu et al. |
| 2020/0167954 A1 | 5/2020 | Wallin et al. |
| 2020/0193829 A1 | 6/2020 | Cheng et al. |

OTHER PUBLICATIONS

Invitation to Pay Additional Fees, Patent Cooperation Treaty Application No. PCT/US2020/15889, dated Apr. 13, 2020, 2 pages.
First Examination Report, Indian Patent Application No. 202147039120, dated Apr. 13, 2022, 6 pages.
Lipson et al., "Driverless: Intelligent Cars and the Road Ahead", Massachusetts Institute of Technology, 2016, pp. 177-180.
Matti et al., "Combining LiDAR Space Clustering and Convolutional Neural Networks for Pedestrian Detection", Aug. 2017, 14th IEEE International Conference on Advanced Video and Signal Based Surveillance, 6 pages.
United States Office Action, U.S. Appl. No. 16/777,386, dated Dec. 23, 2021, 49 pages.
United States Office Action, U.S. Appl. No. 16/777,673, dated Sep. 30, 2021, 14 pages.

\* cited by examiner

PROBABILISTIC NEURAL NETWORK FOR PREDICTING HIDDEN CONTEXT OF TRAFFIC ENTITIES FOR AUTONOMOUS VEHICLES

CROSS REFERENCE TO RELATED APPLICATIONS

This application claims the benefits of priority under 35 USC 119(e) to U.S. Provisional Application No. 62/802,151 filed on Feb. 6, 2019 and U.S. Provisional Application No. 62/822,269 filed on Mar. 22, 2019, each of which is incorporated herein by reference in its entirety for all purposes.

This invention was made with government support under Award No. 1738479 awarded by National Science Foundation's Division of Industrial Innovation and Partnerships (IIP). The government has certain rights in the invention.

TECHNICAL FIELD

The present disclosure relates generally navigating an autonomous vehicle through traffic and more specifically to probabilistic neural networks for predicting hidden context of traffic entities for autonomous vehicles.

BACKGROUND

An autonomous vehicle uses different types of sensors to receive input describing the surroundings of the autonomous vehicle while driving through traffic. For example, an autonomous vehicle may perceive the surroundings using camera images and lidar scans. The autonomous vehicle determines whether an object in the surroundings is stationary, for example, buildings or trees or the object is non-stationary, for example, a pedestrian, a vehicle, and so on. The autonomous vehicle system predicts the motion of non-stationary objects to make sure that the autonomous vehicle is able to navigate through non-stationary obstacles in the traffic.

Conventional systems predict motion of non-stationary objects using kinematics. For example, autonomous vehicles may rely on methods that make decisions on how to control the vehicles by predicting motion vectors of objects near the vehicles. This is accomplished by collecting data of an objects current and past movements, determining a motion vector of the object at a current time based on these movements, and extrapolating a future motion vector representing the object's predicted motion at a future time based on the current motion vector. However, these techniques fail to predict motion of certain non-stationary objects for example, pedestrians, bicyclists, and so on. For example, if the autonomous vehicle detects a pedestrian standing in a street corner, the motion of the pedestrian does not help predict whether the pedestrian will cross the street or whether the pedestrian will remain standing on a street corner. Similarly, if the autonomous vehicle detects a bicyclist in a lane, the current motion of the bicycle does not help the autonomous vehicle predict whether the bicycle will change lanes. Failure of autonomous vehicles fail to accurately predict motion of non-stationary traffic objects results in unnatural movement of the autonomous vehicle, for example, as a result of the autonomous vehicle suddenly stopping due to a pedestrian moving in the road or the autonomous vehicle continuing to wait for a person to cross a street even if the person never intends to cross the street.

SUMMARY

Embodiments of the invention use probabilistic neural networks to predict hidden context attributes associated with traffic entities. A traffic entity may represent a pedestrian, a bicyclist, or another vehicle in a traffic encountered by a vehicle. The hidden context of a traffic entity represents behavior of the traffic entities in the traffic. The system trains a probabilistic neural network for help in navigating through traffic. The probabilistic neural network is configured to receive an image of traffic as input and generate output representing hidden context for a traffic entity displayed in the image.

The probabilistic neural network generates a feature vector for a plurality of features. The feature vector comprises values describing statistical distribution for each feature. The generated output of the probabilistic neural network comprises a plurality of values, each value representing a likelihood of receiving a particular user response from a user presented with the image. The training data set may comprise statistical information describing user responses of users presented with images of traffic.

The system receives a new camera image captured by a camera mounted on an autonomous vehicle navigating through traffic. The system executes the probabilistic neural network to generate output representing hidden context for a traffic entity displayed in the new image. The system determines a measure of uncertainty for each of the plurality of values. The autonomous vehicle navigates to avoid the traffic entity identified in the new image. The navigation of the autonomous vehicle is based on at least the measure of uncertainty generated by the probabilistic neural network.

In an embodiment, the values describing statistical distribution for each feature comprise a mean value and a standard deviation for the feature. The probabilistic neural network is configured to generate samples of features that correspond to their respective distributions. These samples are used to generate different outputs. The distribution of the generated outputs is used to determine a measure of uncertainty of the outputs. The measure of uncertainty is used to navigate the vehicle through traffic, for example, to determine how far to stay from a traffic entity displayed in the image that was provided as input to the probabilistic neural network.

In an embodiment, training the probabilistic neural network comprises determining evidence lower bound between the predicted output and labels of training data set. For example, the predicted output can be a plurality of values and the labels represent a plurality of values representing statistical summary determined from user responses obtained from users presented with images. The training process performs backpropagation based on the evidence lower bound.

In an embodiment, determining the measure of uncertainty for each of the plurality of values is performed by generating a plurality of samples for the input image using the probabilistic neural network and determining a confidence interval for each of the plurality of input using the plurality of samples.

In an embodiment, the autonomous vehicle navigates to ensure that the autonomous vehicle stays at least a threshold distance away from the traffic entity displayed in the new image. The threshold distance is determined based on the measure of uncertainty generated by the probabilistic neural network. For example, the threshold distance is determined to be a value directly related to the measure of uncertainty generated by the probabilistic neural network.

The hidden context may represent a state of mind of a user represented by the traffic entity. The hidden context may represent a task that a user represented by the traffic entity is planning on accomplishing. The hidden context may represent a goal of a user represented by the traffic entity, wherein the user expects to achieve the goal within a threshold time interval. For example, the hidden context may represent a near term goal of the person represented by the traffic entity, for example, indicating that the person is likely to cross the street, or indicating that the person is likely to pick up an object (e.g., a wallet) dropped on the street but stay on that side of the street, or any other task that the person is likely to perform within a threshold time interval. The hidden context may represent a degree of awareness of the autonomous vehicle by a user represented by the traffic entity, for example, whether a bicyclist driving in front of the autonomous vehicle is likely to be aware that the autonomous vehicle is behind the bicycle.

In an embodiment, navigating the autonomous vehicle comprises generating signals for controlling the autonomous vehicle based on the motion parameters, the hidden context of a traffic entity, and the measure if uncertainty generated for the traffic entity by the probabilistic neural network. The generated signals are sent to the controls of the autonomous vehicle.

In an embodiment, the probabilistic neural network is a probabilistic convolutional neural network.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Embodiments of the invention predict hidden context associated with traffic entities that determines behavior of these traffic entities in the traffic. A traffic entity represents an object in traffic, for example, a pedestrian, a bicycle, a vehicle, a delivery robot, and so on. Hidden context includes factors that affect the behavior of such traffic entities, for example, a state of mind of a pedestrian, a degree of awareness of the existence of the autonomous vehicle in the vicinity (for example, whether a bicyclist is aware of the existence of the autonomous vehicle in the proximity of the bicyclist), and so on. The system uses the hidden context to predict behavior of people near a vehicle in a way that more closely resembles how human drivers would judge the behavior.

In one embodiment, a group of users (or human observers) view sample images of traffic entities (such as pedestrians) near streets and/or vehicles and indicate or are measured for their understanding of how they believe the people will behave. These indicators or measurements are then used as a component for training a machine learning based model that predicts how people will behave in a real-world context. In other words, after being trained based on the reactions of human observers to sample images in a training environment, the machine learning based model predicts behavior of traffic entities in a real-world environment, for example, actual pedestrian behavior in a real-world environment.

A non-stationary object may also be referred to as a movable object. An object in the traffic may also be referred to as an entity or a traffic entity.

Systems for predicting human interactions with vehicles are disclosed in U.S. patent application Ser. No. 15/830,549, filed on Dec. 4, 2017 which is incorporated herein by reference in its entirety.

System Environment

Figure 1:
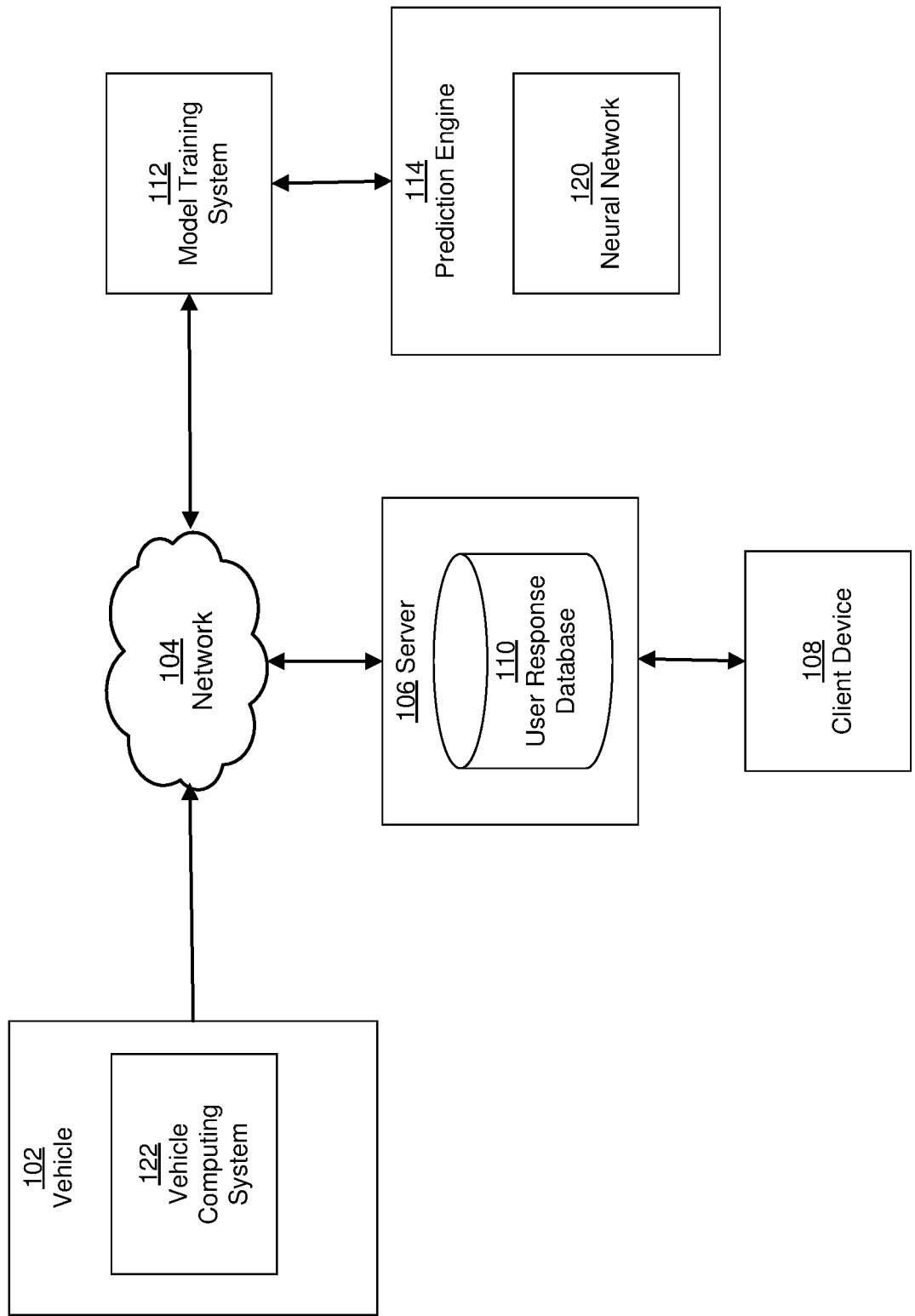
FIG. 1 is a system diagram of a networked system for predicting human behavior according to some embodiments of the invention.

FIG. 1 is a system diagram of a networked system for predicting human behavior according to some embodiments of the invention. FIG. 1 shows a vehicle 102, a network 104, a server 106, a user response database 110, a client device 108, a model training system 112 and a prediction engine 114.

The vehicle 102 can be any type of manual or motorized vehicle such as a car, bus, train, scooter, or bicycle. As described in more detail below, the vehicle 102 can include sensors for monitoring the environment surrounding the vehicle. In one implementation, the sensors can include a camera affixed to any portion of the vehicle for capturing a video of people near the vehicle.

The network 104 can be any wired and/or wireless network capable of receiving sensor data collected by the vehicle 102 and distributing it to the server 106, the model training system 112, and, through the model training system 112, the prediction engine 114. In an embodiment, the prediction engine 114 comprises a neural network 120.

The server 106 can be any type of computer system capable of (1) hosting information (such as image, video and text information) and delivering it to a user terminal (such as client device 108), (2) recording responses of multiple users (or human observers) to the information, and (3) delivering such information and accompanying responses (such as responses input via client device 108) back to the network 104.

The user response database 110 can be any type of database or data storage system capable of storing the image, video, and text information and associated user responses and subsequently recalling them in response to a query.

The model training system 112 can be implemented in any type of computing system. In one embodiment, the system 112 receives the image, video, and/or text information and accompanying, or linked, user responses from the database 110 over the network 104. In some embodiments, the text segments are discrete values or free text responses. The model training system 112 can use images, video segments and text segments as training examples to train an algorithm, and can create labels from the accompanying user responses based on the trained algorithm. These labels indicate how the algorithm predicts the behavior of the people in the associated image, video, and/or text segments. After the labels are created, the model training system 112 can transmit them to the prediction engine 144.

The prediction engine 114 can be implemented in any computing system. In an illustrative example, the prediction engine 114 executes a process that executes a model that has been trained by the model training system 112. This process estimates a label for a new (e.g., an actual "real-world") image, video, and/or text segment based on the labels and associated image, video, and/or text segments that it received from the model training system 112. In some embodiments, this label comprises aggregate or summary information about the responses of a large number of users (or human observers) presented with similar image, video, or text segments while the algorithm was being trained.

In an embodiment, the prediction engine 114 uses machine learning based models for predicting hidden context values associated with traffic entities. In an embodiment, the machine learning based model is a neural network configured to receive an encoding of an image or a video of a traffic entity as input and predict hidden context associated with the traffic entity. Examples of traffic entities include pedestrians, bicyclists, or other vehicles. Examples of hidden context include, awareness of a bicyclist that a particular vehicle is driving close to the bicyclist, and intent of a pedestrian, for example, intent to cross a street, intent to continue walking along a sidewalk, and so on.

Figure 2:
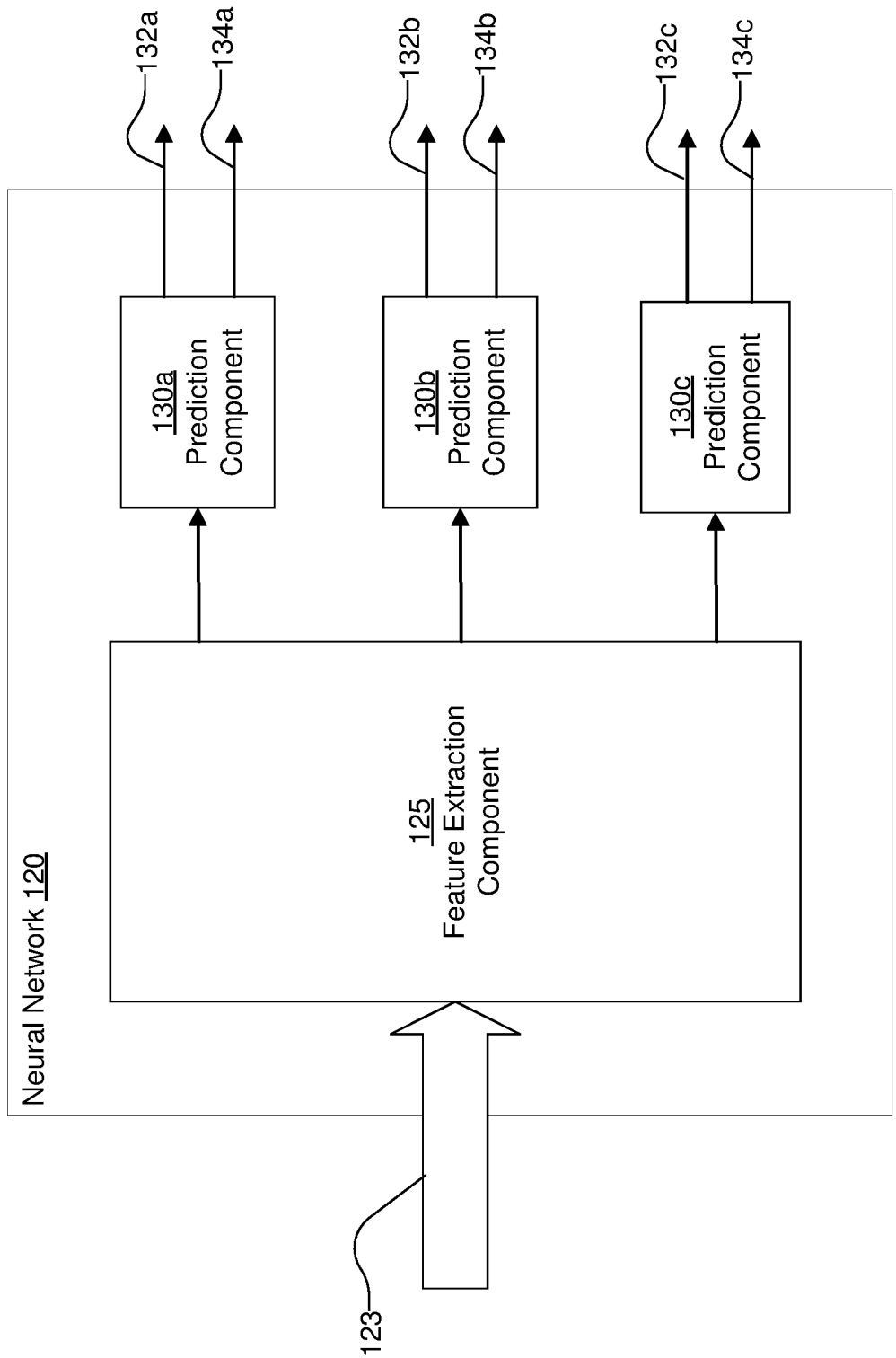
FIG. 2 is the system architecture of a vehicle computing system that routes an autonomous vehicle based on prediction of hidden context associated with traffic objects according to an embodiment of the invention.

FIG. 2 is the system architecture of neural network used for prediction of hidden context associated with traffic entities, according to some embodiments of the invention. The neural network 120 is a deep neural network comprising a plurality of layers of nodes. The layers of the neural network comprise an input layer that receives the input values, an output layer that outputs the result of the neural network and one or more hidden layers. Each hidden layer receives input from a previous layer and generates values that are provided as input to a subsequent layer. In an embodiment, the neural network 120 is a probabilistic neural network. In an embodiment, the neural network 120 is a convolutional neural network, for example, a probabilistic convolutional neural network. In an embodiment, the neural network 120 is an LSTM (long short-term model).

The neural network 120 receives an encoding of an image or video as input 123. The neural network is configured to predict estimates of measures of uncertainty for hidden context attributes. The input 123 comprises stored images or videos provided as training data during a training phase of the neural network 120. An image may represent a video frame. Once the neural network 120 is trained, the neural network 120 may be deployed in a vehicle, for example, an autonomous vehicle.

In an embodiment, the neural network 120 is a multi-task neural network configured to predict a plurality of output values representing different hidden context attributes. A multi-task neural network provides efficiency in training the model since the same model is able to predict multiple values. Accordingly, the process of training of the neural network as well as execution of the trained neural network is efficient in terms of performance. Furthermore, the sharing of the feature extraction component 125 across different prediction components 130 results in better training of the neural network.

The sensors of an autonomous vehicle capture sensor data 160 representing a scene describing the traffic surrounding the autonomous vehicle. The traffic includes one or more traffic entities, for example, a pedestrian. The autonomous vehicle provides sensor data as input to the neural network 120, for example, video frames of videos captured by cameras of the autonomous vehicle. In an embodiment, the input to the neural network 120 is a portion of a video frame that represents a bounding box around a traffic entity, for example, a pedestrian. In an embodiment, the input to the neural network is a sequence of bounding boxes surrounding the traffic entity obtained from a sequence of video frames showing the traffic entity, for example, in a video of a pedestrian captured as the pedestrian walks on a street. The autonomous vehicle uses the results of the neural network model to generate control signals for providing to the vehicle controls for example, accelerator, brakes, steering, and so on for navigating the autonomous vehicle through traffic.

The neural network 120 comprises components including a feature extraction component 125 and a plurality of prediction components 130*a*, 130*b*, 130*c*, and so on. Each prediction component 130 predicts values for a particular hidden context attribute. For example, a prediction component 130*a* may predict values describing intent of a pedestrian to perform certain action (e.g., crossing the street), a prediction component 130*b* may predict values describing awareness of a bicyclist of a vehicle following the bicyclist, and so on.

Each prediction component outputs two values associated with a hidden context attribute, a value 132 representing the predicted value of the hidden context attribute and a value 134 representing a measure of uncertainty associated with the predicted value 132. In an embodiment, the predicted value 132 represents parameters describing statistical distribution of a hidden context attribute. In an embodiment, the predicted value 132 is a vector such that each value of the vector represents a likelihood that at an observer would assign a particular value to the hidden context attribute. For example, the hidden context attribute may have a plurality of possible values v1, v2, v3, and so on and the predicted value 132 is a vector comprising probability values p1, p2, p3, and so on such that p1 represents a likelihood that at an observer would assign value v1 to the hidden context attribute, p2 represents a likelihood that at an observer would assign value v2 to the hidden context attribute, p3 represents a likelihood that at an observer would assign value v3 to the hidden context attribute, and so on.

The predicted value 134 is a measure of uncertainty corresponding to the output 132. Accordingly, if the output 132 is a vector of multiple values, the output 134 is also a vector of multiple values, each value of the vector corresponding to output 134 representing a measure of uncertainty for the corresponding value in the vector corresponding to output 132.

As an example, the system requests user responses from users observing images of traffic entities, wherein each user response is one of a plurality of values. Each value from the plurality of values corresponds to a rating that the user provides to a hidden context of the traffic entity. For example, the user response may be a value between 1 to 5 (e.g., each user response is one value selected from the values 1, 2, 3, 4, and 5). The user response indicates, what the user believes is the value of the hidden context attribute, for example, on a scale from 1-5, a number indicating how likely the user believes, a pedestrian is likely to cross the street or how likely a bicyclist is aware of a vehicle. The output 132 represents a vector of values, each value corresponding to a possible user response and representing the likelihood that a user presented with the input image would provide that user response. The output 134 represents a vector of values, each value representing a measure of uncertainty for the corresponding value from output 132.

In an embodiment, the neural network 120 is a probabilistic neural network that may generate different outputs for the same input if the neural network is executed repeatedly. However, the outputs generated have a particular statistical distribution, for example, mean and standard deviation. The training process adjusts the parameters of the neural network so that the statistical distribution of the predicted output matches the statistical distribution of the labels in the training dataset. The statistical distribution is determined by parameters of the neural network that can be adjusted to generate different statistical distributions. In an embodiment, the feature extraction component generates features such that each feature value is associate with a statistical distribution, for example, mean and standard deviation values.

In an embodiment, the system trains the probabilistic neural network using stochastic variational inference techniques. The stochastic variational inference technique approximates a posterior likelihood (or probability) of data, given the probabilities that are determined using the random variables of the probabilistic neural network. The system adjusts the weights of the probabilistic neural network using back propagation. The system performs back propagation to optimize the evidence lower bound between the predicted values using images from the training data set and the actual values determined from the user responses obtained in response to observing images from the training data set. In an embodiment, the system determined evidence lower bound using Kullback-Leibler divergence between the predicted values and the actual values obtained from user responses. The system uses Kullback-Leibler divergence to compare the statistical distribution of the predicted values with the statistical distribution of the actual values obtained from user responses.

In an embodiment, the neural network 120 generates uncertainty estimate values corresponding to each of the plurality of possible values of the hidden context attribute. For example, the hidden context attribute values may be classified using a plurality of bins, each bin representing a range (or set) of values. The neural network 120 generates uncertainty estimate values for each bin.

Figure 3:
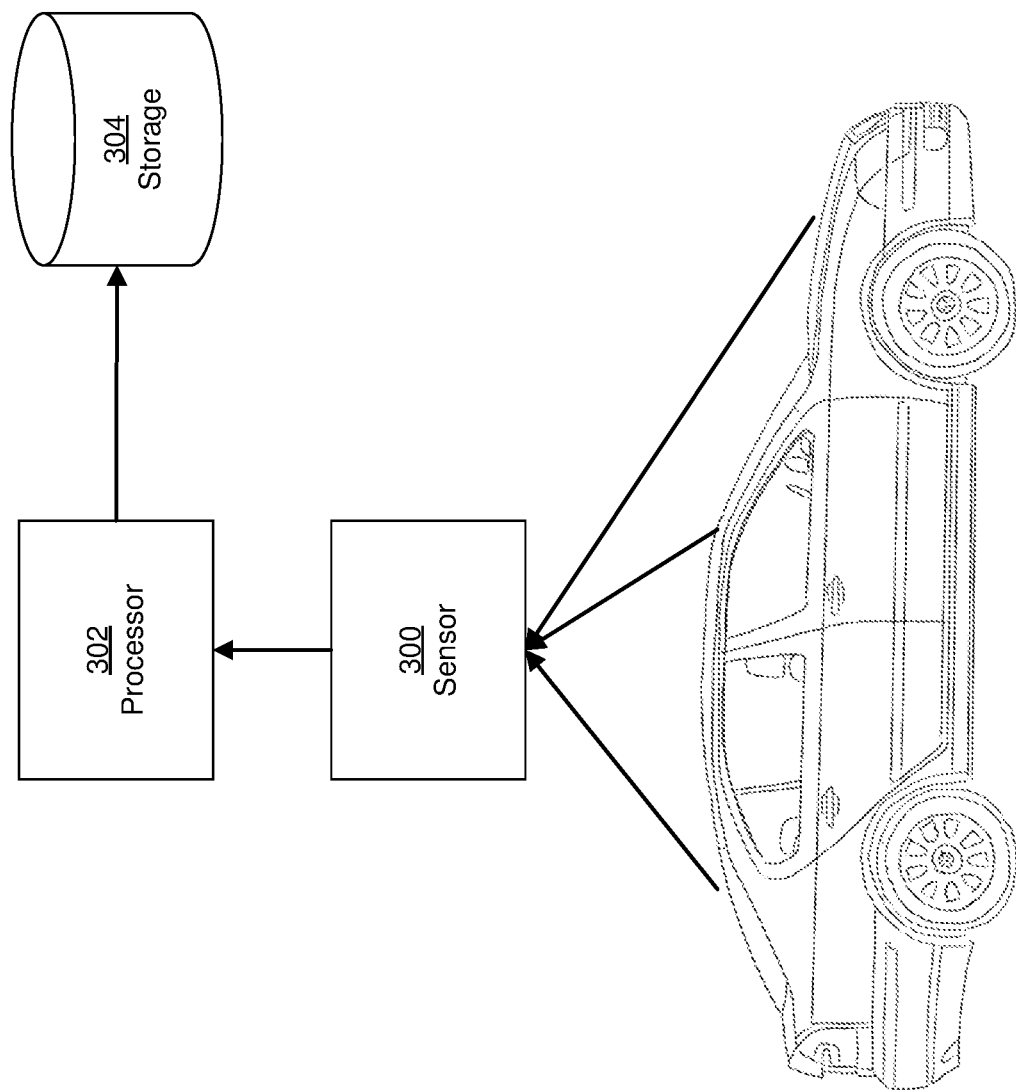
FIG. 3 is a system diagram showing a sensor system associated with a vehicle, according to some embodiments of the invention.

FIG. 3 is a system diagram showing a sensor system associated with a vehicle, according to some embodiments of the invention. FIG. 3 shows a vehicle 306 with arrows pointing to the locations of its sensors 300, a local processor and storage 302, and remote storage 304.

Data is collected from cameras or other sensors 300 including solid state Lidar, rotating Lidar, medium range radar, or others mounted on the car in either a fixed or temporary capacity and oriented such that they capture images of the road ahead, behind, and/or to the side of the car. In some embodiments, the sensor data is recorded on a physical storage medium (not shown) such as a compact flash drive, hard drive, solid state drive or dedicated data logger. In some embodiments, the sensors 300 and storage media are managed by the processor 302.

The sensor data can be transferred from the in-car data storage medium and processor 302 to another storage medium 304 which could include cloud-based, desktop, or hosted server storage products. In some embodiments, the sensor data can be stored as video, video segments, or video frames.

Figure 4:
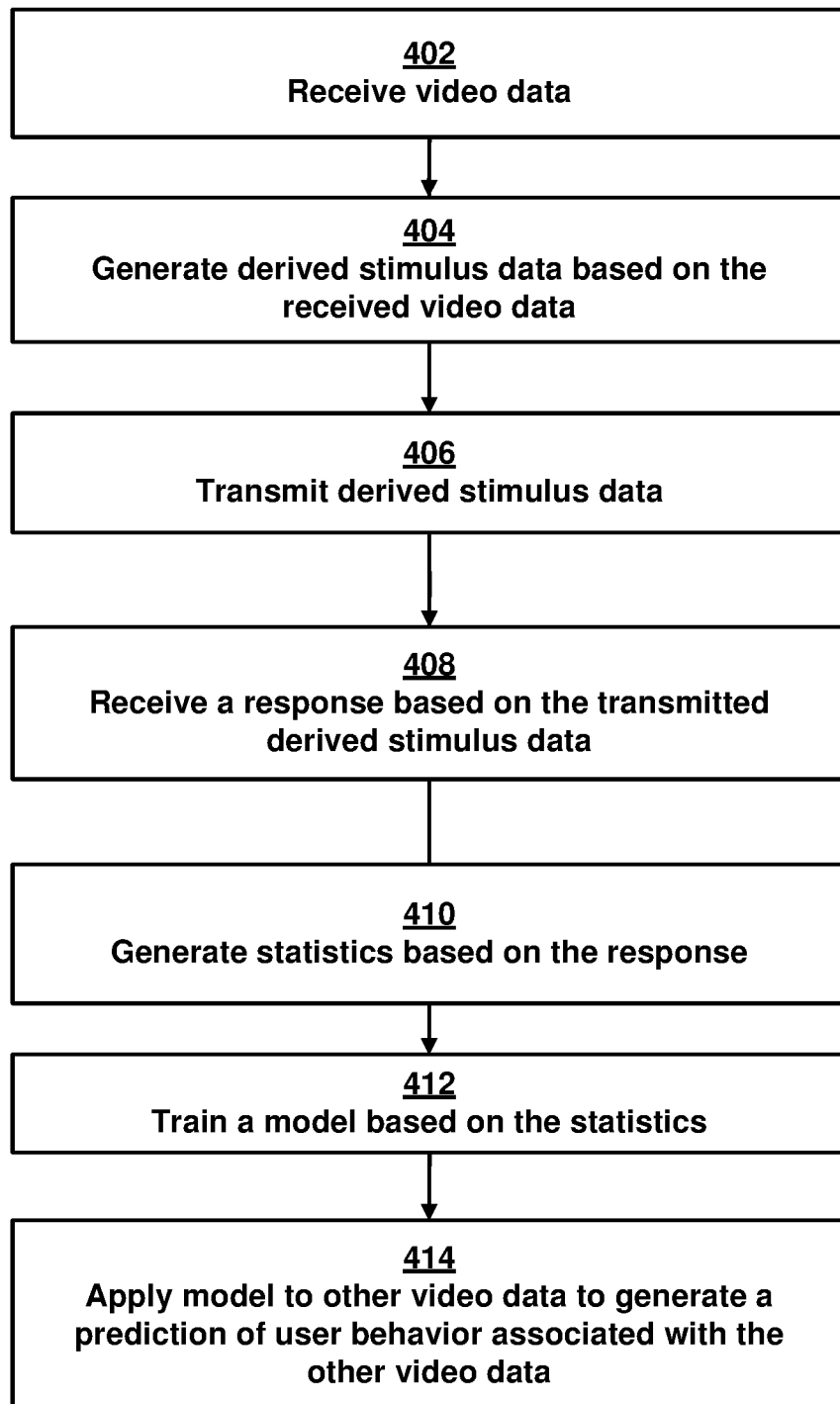
FIG. 4 is a flowchart showing a process of training a machine learning based model to predict hidden context information describing traffic entities, according to some embodiments of the invention.

FIG. 4 is a flowchart showing a process of training a machine learning based model to predict hidden context information describing traffic entities, according to some embodiments of the invention. In one implementation, video or other data is captured by a camera or sensor mounted on the vehicle 102. The camera or other sensor can be mounted in a fixed or temporary manner to the vehicle 102. Of course, the camera does not need to be mounted to an automobile, and could be mounted to another type of vehicle, such as a bicycle. As the vehicle travels along various streets, the camera or sensor captures still and/or moving images (or other sensor data) of pedestrians, bicycles, automobiles, etc. moving or being stationary on or near the streets. In step 402, this video or other data captured by the camera or other sensor is transmitted from the vehicle 102, over the network 104, and to the server 106 where it is stored.

Then, in step 404, video frames or segments are extracted from the stored video or other data and are used to create stimulus data including derived stimulus (or stimuli). In one implementation, the derived stimulus corresponds to a scene in which one or more humans are conducting activities (e.g., standing, walking, driving, riding a bicycle, etc.) beside or on a street and/or near a vehicle. As explained in more detail below for example in step 214 and in the text accompanying FIG. 9, as part of the training process for the prediction algorithm, human observers view the derived stimulus and predict how they believe the humans shown in the derived stimulus will act. In yet a further implementation, after the video frames or segments are extracted from the stored data, the derived stimulus is generated by manipulating the pixels or equivalent array data acquired from the camera or other sensor in step 204, producing a new data file that conveys a portion of the information from the original video with certain aspects highlighted or obscured.

In step 406, the derived stimulus is transmitted from the server 106 and displayed to a large number of users (or human observers) on the client device 108 (or multiple client devices 108). The client devices(s) 108 prompt the human observers to predict how the people shown in the derived stimulus will act, and upon viewing the displayed stimulus, the observers input their responses corresponding to their predictions. For example, the human observers may predict that a bicyclist will continue riding, whether a first person in the stimulus will cross the street, whether another person will remain standing on a street corner, and yet another person will change lanes on his or her bicycle. In an illustrative embodiment, the human observers may make a continuous or ordinal judgment about the state of mind or the predicted behavior of the people shown in the derived stimulus and record that judgment. For example, the human observers may select an appropriate icon displayed on the client devices(s) 108 by clicking a mouse or by pressing a key to indicate their judgment or prediction. The judgment or prediction may correspond to the human observers' assessment of the state of mind of the person in the derived stimulus or other awareness or intention that would be relevant to a hypothetical driver who sees the person in the derived stimulus while driving. In step 408, the derived stimulus and associated human observer responses are transmitted from the client device(s) 108 to the server 106 and recorded in the user response database 110.

In step 410, summary statistics are generated based on the user responses. For example, the statistics may characterize the aggregate responses of multiple human observers to a particular derived stimulus. For instance, if the derived stimulus shows a pedestrian walking on a sidewalk towards an intersection, the response can be categorized in terms of how many human observers believe that the pedestrian will stop upon reaching the intersection, continue walking straight across the intersection, turn a corner and continue walking along the sidewalk without crossing the intersection, etc. These summary statistics can characterize the human observer responses in terms of certain parameters associated with the statistics, such as a content of a response, a time associated with entering a response, and a position of an eye of a human observer associated with the response. The parameters can also be associated with a (1) central tendency, variance, skew, kurtosis, scale, or histogram. For example, the amount of time users took to input their responses can be characterized in terms of central tendency, variance, skew, kurtosis, scale, histogram. Also, the statistics can include a parameter that additionally or alternatively characterizes the movement of the human observers' eyes relative to a display when making the judgments in terms of central tendency, variance, skew, kurtosis, scale, histogram or two-dimensional distribution. In one embodiment, the statistics are stored in the user response database 110 with an index that identifies the raw video or sensor data from which the derived stimulus was generated. In a further embodiment, the statistics stored in the database 110 cover a large set of images of people on or near roads and are categorized in a number of different categories, such as pedestrian, driver, motorcyclist, bicyclist, scooter driver, self-balancing scooter rider, unicyclist, motorized wheelchair user, skateboarder, or others. Moreover, the statistics are respectively stored along with, or linked to, the images of the derived stimuli corresponding to the statistics.

In step 412, the stored statistics and corresponding images (e.g., the video frames or segments that were extracted from the video or other data (captured from the camera or sensor of the vehicle 202)) are sent over the network 104 to the model training system 112 and used to train a prediction algorithm. For example, the collection of images and statistics can be used to train a supervised learning algorithm, which can comprise a random forest regressor, a support vector regressor, a simple neural network, a deep convolutional neural network, a recurrent neural network, a long-short-term memory (LSTM) neural network with linear or nonlinear kernels that are two dimensional or three dimensional, or any other supervised learning algorithm which is able to take a collection of data labeled with continuous values and adapt its architecture in terms of weights, structure or other characteristics to minimize the deviation between its predicted label on a novel stimulus and the actual label collected on that stimulus using the same method as was used on the set of stimuli used to train that network. The model is given data which comprises some subset of the pixel data from the video frames that the summary statistics were generated from. In one implementation, this subset includes the pixel data contained in a bounding box drawn to contain the boundaries of the person, cyclist, motorist and vehicle, or other road user, including their mode of conveyance. In some other implementations, it also includes the entire pixel data from the rest of the image. In one of those implementations, that pixel data is selected according to criteria such as the salience of those features in terms of contrast, lighting, presence of edges, or color. In an additional implementation, the features can include descriptive meta-data about the images such as the dimensions and location of the bounding box, the shape of the bounding box or the change in size or position of the bounding box from one frame to the next.

In step 414, the prediction engine 114 uses the trained model from the model training system 112 to predict the actual, "real-world" or "live data" behavior of people on or near a road. In one embodiment, the prediction engine 114 receives "live data" that matches the format of the data used to train the trained model. For example, if the trained model was trained based on video data received from a camera on the vehicle 102, the "live data" that is input to the algorithm likewise is video data from the same or similar type camera. On the other hand, if the model was trained based on another type of sensor data received from another type of sensor on the vehicle 102, the "live data" that is input to the prediction engine 114 likewise is the other type of data from the same or similar sensor.

The trained model or algorithm makes a prediction of what a pedestrian or other person shown in the "live data" would do based on the summary statistics and/or training labels of one or more derived stimulus. The accuracy of the model is determined by having it make predictions of novel derived stimuli that were not part of the training images previously mentioned but which do have human ratings attached to them, such that the summary statistics on the novel images can be generated using the same method as was used to generate the summary statistics for the training data, but where the correlation between summary statistics and image data was not part of the model training process. The predictions produced by the trained model comprise a set of predictions of the state of mind of road users that can then be used to improve the performance of autonomous vehicles, robots, virtual agents, trucks, bicycles, or other systems that operate on roadways by allowing them to make judgments about the future behavior of road users based on their state of mind.

The server 106 generates derived stimuli from raw camera or sensor data of the vehicle for presenting to human observers. As described above, sensor data can include video segments or specific frames. These frames can either be contiguous or non-contiguous, and can be in the original order, in a permuted order, in reverse order, or in random order. Some of the frames can be repeated once or more than once.

Some of the frames may be manipulated. The frames can be manipulated by adjusting pixel values. These manipulations can include blurring, the addition or one or more occluding bars, bands, or shapes, sharpening, the removal of color information, the manipulation of color information, the drawing of non-occluding or highlighting shapes on the image, other manipulations, or a combination of the manipulations listed here, or a combination of the manipulations listed here with other manipulations, or other manipulations of the pixels not listed combined with each other. The manipulations serve the purpose of highlighting, occluding or degrading portions of the image, so that when the images are shown to the human observers, they are directed to people or specific portions of the image when predicting what the people in the images will do. For example, using the highlighting described above, a certain pedestrian in a scene can be isolated such that a human observer's feedback can be more reliably associated with the pedestrian. Frames may be recombined to form a derived stimulus. In some embodiments, if there is only one frame, that frame comprises the derived stimulus. If there is more than one frame those frames may then be recombined.

Predictions and other information is collected from human observers based on derived stimuli. Human observers are given detailed instructions about how to answer questions about derived stimuli. Those observers are presented with derived stimuli and asked to answer questions about them. The observers respond to the stimuli and those responses are recorded. The recorded responses are aggregated and logged in a database, for example, the user response database 110.

Human observers are recruited to participate on one or several crowdsourcing websites, such as Amazon's Mechanical Turk or at a physical location provided with a display. The observers are given detailed written and pictorial instructions explaining the task that they are about to complete. These instructions give examples of situations that might be depicted in the derived stimuli, and the kinds of responses that would be appropriate for those situations.

The human observers may be shown a display which includes the derived stimulus. The display also includes a mechanism for making a judgment about the stimulus. The mechanism for making the judgment can be a continuous indicator such as a ribbon on which the observer could drag a control to a certain point. The mechanism can also be an ordinal measure such as a Likert scale where the observer can make a judgment about a degree of certainty of the judgment. The mechanism can also be a control that the human observer drags with their mouse to draw a trajectory onscreen indicating a judgment. The mechanism can also be a text entry field where the observer types a description of their judgment.

The judgment that the human observer makes is a hidden context attribute that may represent an evaluation of the state of mind of a road user depicted in the derived stimulus. The evaluation can be of the intention, awareness, personality, state of consciousness, level of tiredness, aggressiveness, enthusiasm, thoughtfulness or another characteristic of the internal mental state of the pictured road user. If the ratings collected are on an ordinal scale they can describe the characteristic using language of probability, such as "the other driver may be attentive" or "the other driver" is definitely attentive" or "the other driver is definitely not attentive".

The ratings of large numbers of human observers are collected. Summary statistics are generated based on the responses of all of the observers who looked at an image. Individual variability in responses to a given stimulus can be characterized in the information given by the observers to the learning algorithm. The summary statistics might include unweighted information from all observers, or might exclude observers based on extrinsic or intrinsic criteria such as the time it took an observer to respond, the geographical location of an observer, the observer's self-reported driving experience, or the observer's reliability in making ratings of a set of other images.

The explicit response of the observer is recorded as well as implicit data. The implicit data can include how long the subject took to respond, if they hesitated in their motions, if they deleted keystrokes, if they moved the mouse anywhere other than the location corresponding to the response they eventually chose, where their eyes moved, or other implicit measures.

The responses are aggregated and recorded in a data structure, such as the user response database 110. This data structure is then sent as a text field to a networked computer system running database software and logged in a database.

Figure 6:
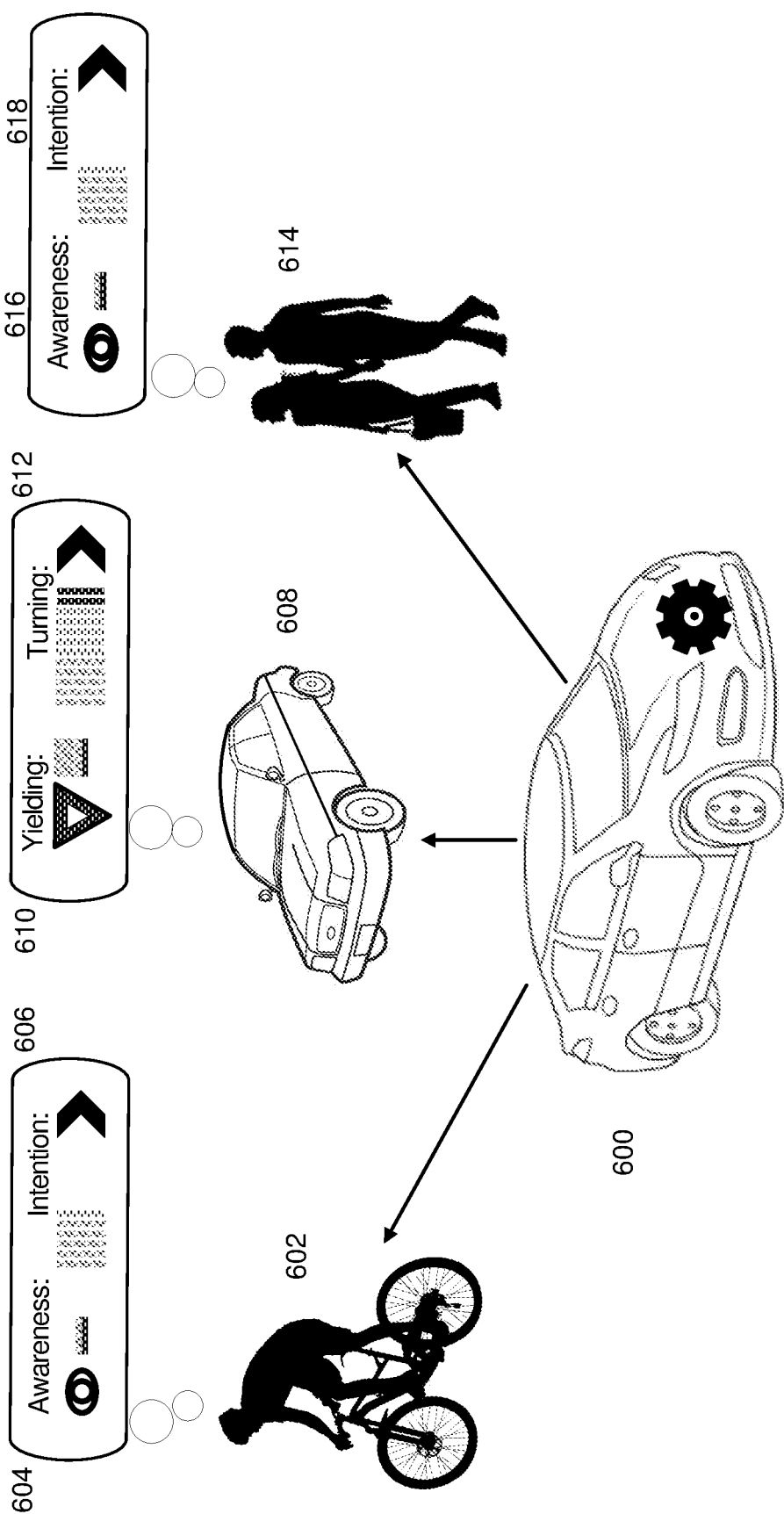
FIG. 6 is a diagram showing an example of an application of a context user prediction process in an automobile context, according to some embodiments of the invention.

For each stimulus rated by each human observer, a response is recorded that could be a continuous, discrete, or ordinal value. This value may refer to the probability of the pictured human road user has a given state of mind—e.g. that a pedestrian is likely to cross the street or that an oncoming vehicle is unlikely to be willing to yield to the vehicle containing the sensor if the vehicle containing the sensor needs to turn. In some embodiments, a higher ordinal value (e.g., the ordinal 4 as shown in FIG. 6) indicates that a human observer believes that there is a higher probability that the pictured human road user has a given state of mind or will perform a particular action. On the other hand, a lower ordinal value (e.g., the ordinal 1) indicates that the human observer believes that there is a lower probability that the pictured human road user has the state of mind or will perform the particular action. On the other hand, in some embodiments, a lower ordinal value can indicate a higher probability of an action, and a higher ordinal value can indicate a lower probability of an action.

An amount of time associated with a subject responding to the derived stimulus may also be recorded. In some embodiments, this time is associated with the overall reliability of the human observer's rating. For example, a response associated with a lower response time may be weighted higher and a response associated with a slower response time may be weighted lower.

Summary statistics of a video frame or derived stimulus is generated. These summary statistics could include measurements of the central tendency of the distribution of scores like the mean, median, or mode. They could include measurements of the heterogeneity of the scores like variance, standard deviation, skew, kurtosis, heteroskedasticity, multimodality, or uniformness. They could also include summary statistics like those above calculated from the implicit measurements of the responses listed above. The calculated summary statistics are linked to the video frame or sensor data frame associated with the responses from which they were calculated.

The summary statistics is used for training machine learning based models. The machine learning based model may be any type of supervised learning algorithm capable of predicting a continuous label for a two or three dimensional input, including but not limited to a random forest regressor, a support vector regressor, a simple neural network, a deep convolutional neural network, a recurrent neural network, a long-short-term memory (LSTM) neural network with linear or nonlinear kernels that are two dimensional or three dimensional.

In one embodiment of the model training system 112, the machine learning based model can be a deep neural network. In this embodiment the parameters are the weights attached to the connections between the artificial neurons comprising the network. Pixel data from an image in a training set collated with human observer summary statistics serves as an input to the network. This input can be transformed according to a mathematical function by each of the artificial neurons, and then the transformed information can be transmitted from that artificial neuron to other artificial neurons in the neural network. The transmission between the first artificial neuron and the subsequent neurons can be modified by the weight parameters discussed above. In this embodiment, the neural network can be organized hierarchically such that the value of each input pixel can be transformed by independent layers (e.g., 10 to 20 layers) of artificial neurons, where the inputs for neurons at a given layer come from the previous layer, and all of the outputs for a neuron (and their associated weight parameters) go to the subsequent layer. At the end of the sequence of layers, in this embodiment, the network can produce numbers that are intended to match the human summary statistics given at the input. The difference between the numbers that the network output and the human summary statistics provided at the input comprises an error signal. An algorithm (e.g., back-propagation) can be used to assign a small portion of the responsibility for the error to each of the weight parameters in the network. The weight parameters can then be adjusted such that their estimated contribution to the overall error is reduced. This process can be repeated for each image (or for each combination of pixel data and human observer summary statistics) in the training set. At the end of this process the model is "trained", which in some embodiments, means that the difference between the summary statistics output by the neural network and the summary statistics calculated from the responses of the human observers is minimized.

Figure 5:
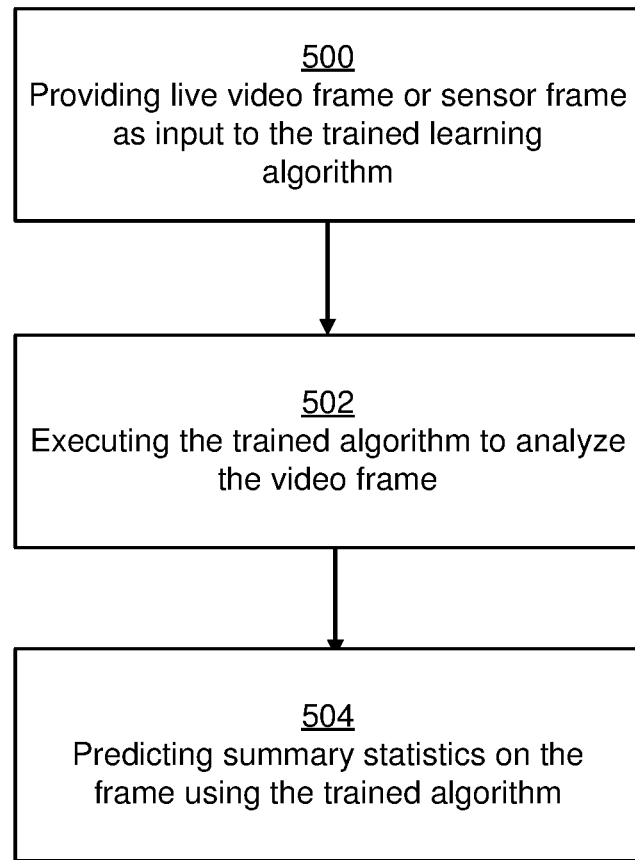
FIG. 5 is a flowchart showing a process of predicting the state of mind of road users using a trained learning algorithm, according to some embodiments of the invention.

FIG. 5. is a flowchart showing a process of predicting the state of mind of road users using a trained learning algorithm, according to some embodiments of the invention. In step 500, the training algorithm receives a "real world" or "live data" video or sensor frame. Then in step 502, the trained algorithm analyzes the frame, thus enabling the algorithm in step 504 to output a prediction of summary statistics on the frame.

The "real world" or "live data" video or other sensor frames from a car-mounted sensor are delivered to the trained learning algorithm in step 500. These frames have the same resolution, color depth and file format as the frames used to train the algorithm. These frames are delivered as individual frames or as sequences according to the format used to train the original algorithm.

Each of these frames is analyzed by being passed through the trained model in step 502. In one embodiment, the data from the frame that was passed through the model would comprise the pixel data from a camera. This data would be transformed by a trained artificial neural network. At the final stage of the processing in the artificial network, it would produce an output. This output is the model output in step 504.

The model outputs a number or set of numbers that comprise the predicted summary statistics for the "real world" or "live data" image in step 504. The predicted summary statistics are the model's best estimation of what the summary statistics would be on the image if the image had human annotations collected. The prediction is generated automatically by passing the sensor data through the model, where the information is transformed by the internal mechanisms of the model according to the parameters that were set in the training process. Because these summary statistics characterize the distribution of human responses that predict the state of mind of a road user pictured in the stimulus, the predicted statistics are therefore a prediction of the aggregate judgment of human observers of the state of mind of the pictured road user and thus an indirect prediction of the actual state of mind of the road user.

FIG. 6 is a diagram showing an example of an application of a context user prediction process in an automobile context, according to some embodiments of the invention. In this example intention 606 618 means that the road user 602 614 has the goal of moving into the path of the vehicle 600 before the vehicle 600 (on which the system is mounted) reaches their position. Awareness 604 616 in this example means that the road user 602 614 understands that the vehicle on which the system is mounted 600 is present in their vicinity. In this example, when cyclist 602 rides into the field of view of a camera mounted on vehicle 600, the pixel data of the camera image of the cyclist is fed to a trained machine learning based model as described above in step 500. The trained machine learning based model analyzes the image as described above in step 502. The trained machine learning based model predicts summary statistics as in step 504. These summary statistics are an estimate of what the summary statistics would be for a collection of human observers who were shown a derived stimulus of the camera data. The estimates summary statistics are therefore the system's best answer to the question "does this cyclist intend to enter the path of the vehicle." The vehicle is therefore able to make a guess 606 about the intention of the cyclist that is closely matched to the guess that a human driver would make in that same situation. In this example, the intention of the cyclist 606 is relatively high, as indicated by the number of horizontal bars in the display. The system installed on an automobile 600 also makes predictions about the awareness 604 of cyclists of the vehicle 600, by the same method described for intention. It also makes predictions about the willingness of an automobile 608 to yield 610 or its desire to turn across the system-containing vehicle's path 612 by the same method described above. In the case of the automobile the questions that human subjects answered that would be predicted by the algorithm are "would the vehicle be willing to yield" 610 and "does the vehicle wish to turn across your path" 612. It also makes predictions about the likelihood of pedestrians 614 to cross in front of the vehicle 618, and whether those pedestrians are aware of the vehicle 616, by the same method described above.

The models described above may be implemented as a real-time module that makes predictions of behavior of traffic entities based on input from cameras or other sensors installed on a car 600. In the case of an autonomous car, these predictions may be used to make inferences about the intent of road users such as cyclists 602, other motorists 608, and pedestrians 614 to cross into the path of the car, as well as whether the road users are aware of the car and its future path. They can also be used to predict whether other road users would be surprised, welcoming, or aggressively unwelcoming if the car were to engage in maneuvers which would take it into the path of another road user (e.g., would an oncoming car yield if the car implementing the systems and methods described herein were to turn left).

Navigating Autonomous Vehicle Based on Hidden Context

The vehicle computing system 122 predicts hidden context representing intentions and future plans of a traffic entity. The hidden context may be used for navigating the autonomous vehicle, for example, by adjusting the path planning of the autonomous vehicle based on the hidden context. The vehicle computing system 122 may improve the path planning by taking a machine learning based model that predicts the hidden context representing a level of human uncertainty about the future actions of pedestrians and cyclists and uses that as an input into the autonomous vehicle's motion planner. The training dataset of the machine learning models includes information about the ground truth of the world obtained from one or more computer vision models. The prediction engine 114 and the trained neural network 120 is provided to a vehicle computing system 122 of a vehicle (e.g., an autonomous vehicle) for execution at run time, for example, while navigating the vehicle through traffic. The vehicle computing system 122 may use the output of the prediction engine 114 to generate a probabilistic map of the risk of encountering an obstacle given different possible motion vectors at the next time step. Alternatively, the vehicle computing system 122 may use the output of the prediction engine 114 to determine a motion plan which incorporates the probabilistic uncertainty of the human assessment.

In an embodiment, the prediction engine 114 determines a metric representing a degree of uncertainty in human assessment of the near-term goal of a pedestrian or any user representing a traffic entity. The specific form of the representation of uncertainty is a model output that is in the form of a probability distribution, capturing the expected distributional characteristics of user responses of the hidden context of traffic entities responsive to the users being presented with videos/images representing traffic situations. The model output may comprise summary statistics of hidden context, i.e., the central tendency representing the mean likelihood that a person will act in a certain way and one or more parameters including the variance, kurtosis, skew, heteroskedasticity, and multimodality of the predicted human distribution. These summary statistics represent information about the level of human uncertainty.

In an embodiment, the vehicle computing system 122 determines the measure of uncertainty as a confidence interval for a predicted output 132. At inference time (i.e., execution time) for the neural network 120, the vehicle computing system 122 executes the neural network 120 to generate multiple samples per output value. For example, if the user response can be any one of a plurality of user response values, the probabilistic neural network generates an output value corresponding to each of the plurality of user response values. The vehicle computing system 122 executes the probabilistic neural network to generate m samples for each output value (where m is value greater than 1). Accordingly, there are m probabilities generated per output value. The vehicle computing system 122 uses this collection of probabilities for each output value to determine the measure of uncertainty for that output value. In an embodiment, the vehicle computing system 122 generates a measure of uncertainty represented by a confidence interval. For example, the vehicle computing system 122 may generate a 95% confidence interval by considering the 2.5th and 97.5th percentile for each possible output value. Each output value may correspond to a bin representing a possible user response.

The vehicle computing system 122 may determine the confidence interval by determining various statistical metrics from the generated set of output values corresponding to the generated samples and combining the statistical measures. For example, the vehicle computing system 122 may determine a mean value, a Z-value and determine the confidence interval based on the mean value and the Z-value. In an embodiment, the vehicle computing system 122 determines the confidence interval using the formula $\bar{x} \pm z^* \sigma/(\sqrt{n})$, where $\bar{x}$ is the mean value of the set, z is the z-value, $\sigma$ is the standard deviation, and n is the number of observations. The z-value depends on the percentage value corresponding to the confidence interval. The vehicle computing system 122 may determine a N % confidence interval, where example values of N are 95%, 90%, or any other percentage value. The z-value depends on the value of N.

In an embodiment, the vehicle computing system 122 represents the hidden context as a vector of values, each value representing a parameter, for example, a likelihood that a person represented by a traffic entity is going to cross the street in front of the autonomous vehicle, a degree of awareness of the presence of autonomous vehicle in the mind of a person represented by a traffic entity, and so on.

Overall Process of Navigating an Autonomous Vehicle Through Traffic

Figure 7:
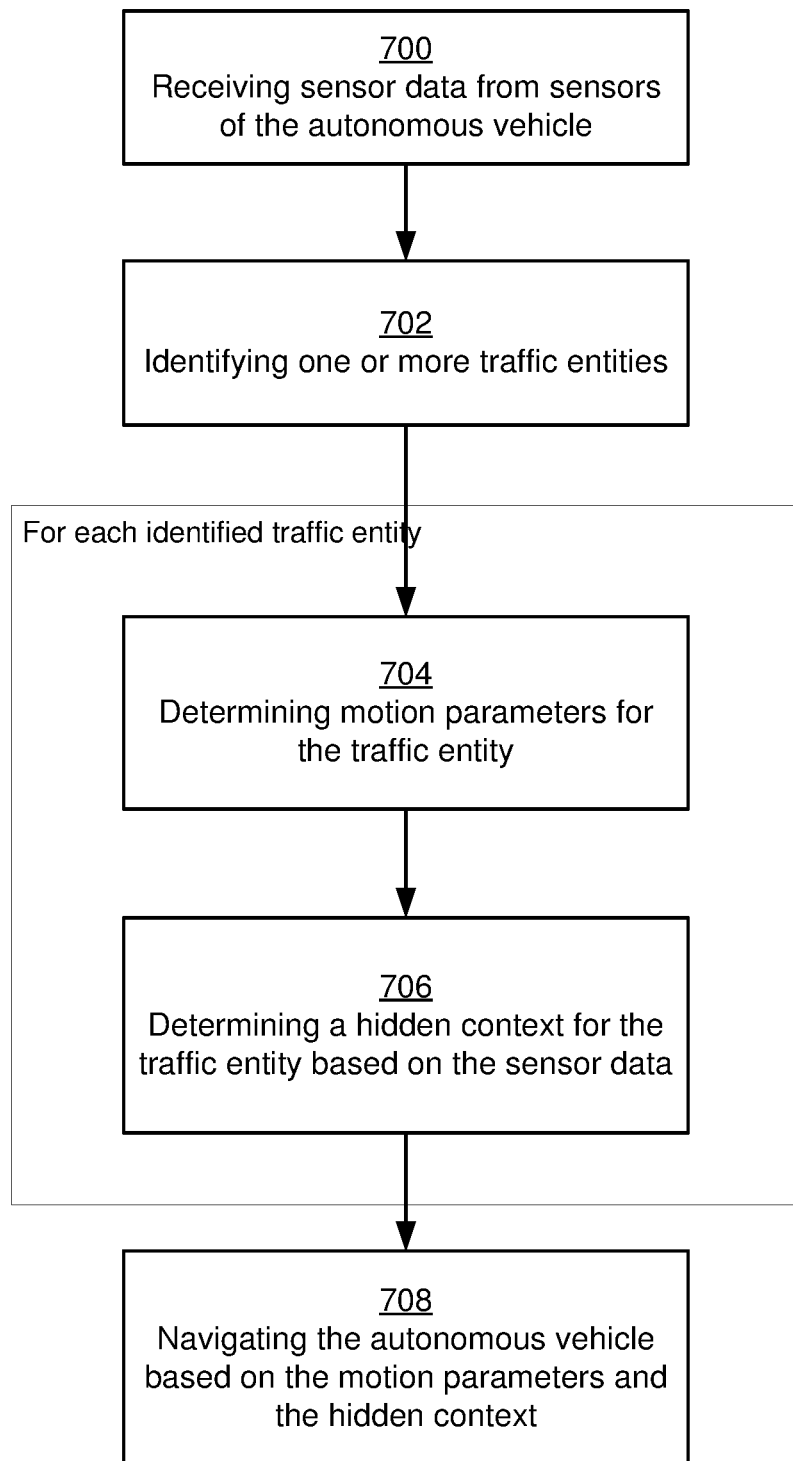
FIG. 7 represents a flowchart illustrating the process of navigating the autonomous vehicle based on hidden context, according to an embodiment.

FIG. 7 represents a flowchart illustrating the process of navigating the autonomous vehicle based on hidden context, according to an embodiment. The vehicle computing system 122 receives 700 sensor data from sensors of the autonomous vehicle. For example, the vehicle computing system 122 may receive lidar scans from lidars and camera images from cameras mounted on the autonomous vehicle. In an embodiment, the vehicle computing system 122 builds a point cloud representation of the surroundings of the autonomous vehicle based on the sensor data. The point cloud representation includes coordinates of points surrounding the vehicle, for example, three dimensional points and parameters describing each point, for example, the color, intensity, and so on.

The vehicle computing system 122 identifies 702 one or more traffic entities based on the sensor data, for example, pedestrians, bicyclists, or other vehicles driving in the traffic. The traffic entities represent non-stationary objects in the surroundings of the autonomous vehicle.

In an embodiment, the autonomous vehicle obtains a map of the region through which the autonomous vehicle is driving. The autonomous vehicle may obtain the map from a server. The map may include a point cloud representation of the region around the autonomous vehicle. The autonomous vehicle performs localization to determine the location of the autonomous vehicle in the map and accordingly determines the stationary objects in the point cloud surrounding the autonomous vehicle. The autonomous vehicle may superimpose representations of traffic entities on the point cloud representation generated.

The vehicle computing system 122 repeats the following steps 704 and 706 for each identified traffic entity. The vehicle computing system 122 determines 704 motion parameters for the traffic entity, for example, speed and direction of movement of the traffic entity. The vehicle computing system 122 also determines 706 a hidden context associated with the traffic entity using the prediction engine 114. The vehicle computing system 122 determines a measure of uncertainty for the hidden context using the probabilistic neural network.

The vehicle computing system 122 navigates 708 the autonomous vehicle based on the motion parameters, the hidden context, and the measure of uncertainty. For example, the vehicle computing system 122 may determine a safe distance from the traffic entity that the autonomous vehicle should maintain based on the motion parameters of the traffic entity. The safe distance is also referred to as a threshold distance, such that the autonomous vehicle navigates to stay at least the threshold distance away from a traffic entity observed in the traffic. The vehicle computing system 122 modulates the safe distance based on the hidden context. The vehicle computing system 122 may adjust the safe distance based on whether the near-term goal of the person indicating that the person intends to reach a location in the direction of the movement of the traffic entity or in a different direction. For example, based on the motion parameters, the vehicle computing system 122 may determine that the autonomous vehicle can drive within X meters of the traffic entity. However, the hidden context indicates that the person represented by the traffic entity intends to cross the street in a direction different from the direction indicated by the motion parameters. In this situation, the vehicle computing system 122 adjusts the safe distance such that the autonomous vehicle is able to drive closer to the traffic entity than the distance X. On the other hand, if the hidden context indicates that the person represented by the traffic entity intends to cross the street in a direction same as the direction indicated by the motion parameters, the vehicle computing system 122 adjusts the safe distance such that the autonomous vehicle maintains a distance greater than X from the traffic entity.

The vehicle computing system 122 modulates the safe distance based on the measure of uncertainty for the output values. In cases where the measure of uncertainty is very high, the vehicle computing system 122 increases the safe distance from the traffic entity by certain factor. In cases where the measure of uncertainty is very low, the vehicle computing system 122 does not adjust the safe distance from the traffic entity or increases the safe distance from the traffic entity by a much smaller factor. Accordingly, the vehicle computing system 122 determines the safe distance to be a value directly related to the measure of uncertainty generated by the probabilistic neural network. For example, the factor by which the safe distance is increased is a value directly proportional to a degree of uncertainty of the output.

Overall Process of Training Neural Network

Figure 8:
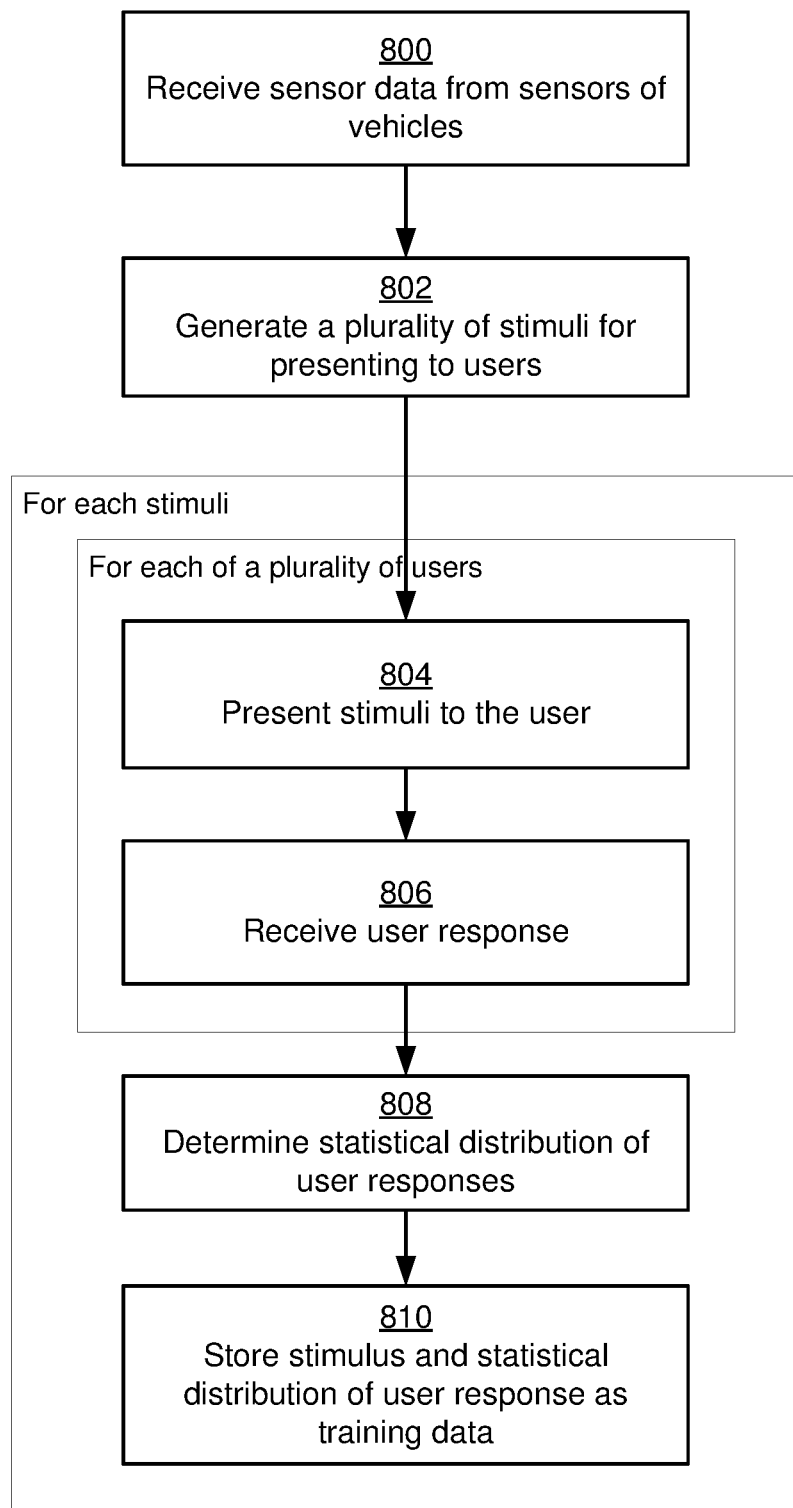
FIG. 8 represents a flowchart illustrating the process of generating training dataset for training of neural network illustrated in FIG. 2, according to an embodiment.

FIG. 8 represents a flowchart illustrating the process of generating training dataset for training of neural network illustrated in FIG. 1B, according to an embodiment. The steps illustrated in the flowchart may be performed in an order different from that illustrated in FIG. 8. For example, certain steps may be performed in parallel. The steps may be performed by modules other than those indicated herein.

The vehicle computing system 122 receives 800 sensor data from sensors of the autonomous vehicle. For example, the vehicle computing system 122 may receive lidar scans from lidars and camera images from cameras mounted on the autonomous vehicle. The vehicle computing system 122 provides the sensor data to the server 106 which provides the sensor data to the model training system 82. The server 106 identifies one or more traffic entities based on the sensor data, for example, pedestrians, bicyclists, or other vehicles driving in the traffic. The traffic entities represent non-stationary objects in the surroundings of the autonomous vehicle.

The server 106 determines stimuli for presenting to users. A stimulus may be an image, for example, a video frame showing a traffic entity. A stimulus may be a video, for example, a portion of a video showing a traffic entity. In an embodiment, the server 106 identifies a bounding box surrounding a video frame or image and may present only the portion of the video frame or image within the bounding box to a user.

The server 106 repeats the following steps for each stimulus. The server 106 presents 804 the stimuli to users with request to provide user responses describing some hidden context attribute of the traffic entity, for example, state of mind of a pedestrian/bicyclist or a measure of awareness of a vehicle by a pedestrian or bicyclist. The stimuli are presented to users via a user interface, for example, via a webpage of a website. The server 106 repeats the step of presenting 804 and receiving 806 user responses for each of a plurality of users.

The server 106 determines 808 a statistical distribution of user responses. For example, the statistical distribution may comprise a mean value and a standard deviation value. The server 106 stores 810 the stimulus and corresponding statistical distribution of user responses as training dataset for training of the neural network 120. The server 106 provides the training dataset to the model training system 112.

Figure 9:
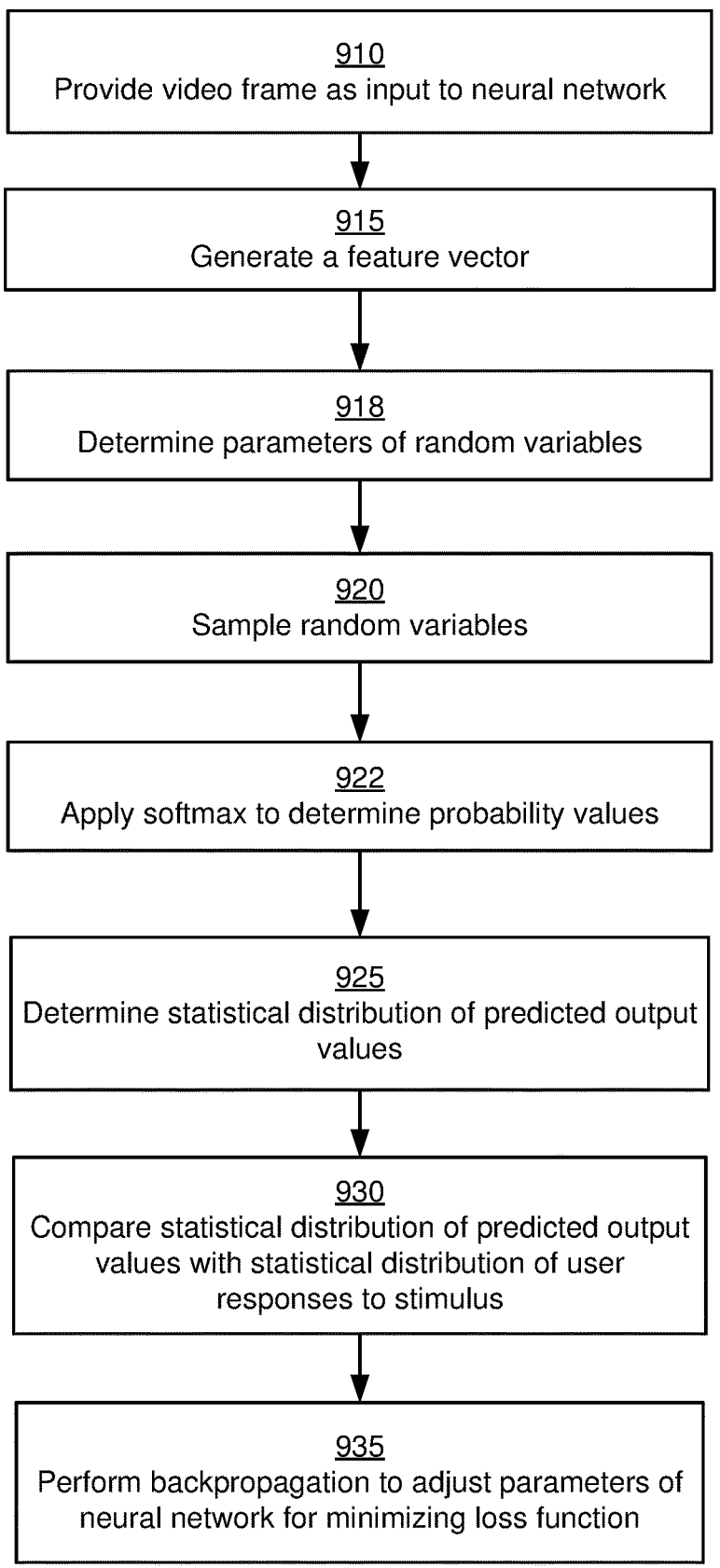
FIG. 9 represents a flowchart illustrating the process of training of neural network illustrated in FIG. 1B, according to an embodiment.

FIG. 9 represents a flowchart illustrating the process of training of neural network illustrated in FIG. 2, according to an embodiment. The steps illustrated in the flowchart may be performed in an order different from that illustrated in FIG. 9. For example, certain steps may be performed in parallel. The steps may be performed by modules other than those indicated herein.

The model training system 112 performs the following steps to train the neural network 120. The model training system 112 repeats the steps for each image/video frame or video stored in the training dataset. The model training system 112 provides a video frame as input to the neural network 120. The video frame may be encoded for example, as an array of pixel data. Each pixel data may comprise the position of the pixel in the image and one or more values, for example, color of the pixel.

The model training system 112 executes the neural network 120 to generate outputs. The model training system 112 repeatedly executes the neural network 120. As part of execution, the feature extraction component 125 of the neural network 120 generates 915 a feature vector. The system determines 918 parameters of random variables based on the feature vector, for example, mean and standard deviation for a normal distribution. The system performs sampling 920 of the random variables to generate a matrix wherein the rows of the matrix are sampled vectors of values. The system probability values corresponding to each row for example by applying 922 a softmax function to each row.

Each prediction component 130 predicts 918 output values of the hidden context. The neural network 120 may generate a different output in each execution and the output values have a particular statistical distribution that is determined by the parameters of the neural network 120.

The model training system 112 determines 925 statistical distribution of the predicted output values. The model training system 112 compares 930 the statistical distribution of the predicted output values with the statistical distribution of the user responses received by presenting the video frame to users as a stimulus. The model training system 112 may determine a loss function value based on the statistical distribution of the predicted output values with the statistical distribution of the user responses. The model training system 112 adjusts the parameters of the neural network 120 by performing back propagation to minimize the loss function.

The trained neural network is provided to the vehicle computing system 122 for use in navigating the autonomous vehicle. The autonomous vehicle receives sensor data, for example, camera images/video frames as the autonomous vehicle drives through traffic. The vehicle computing system 122 identifies traffic entities in the images/video frames. The vehicle computing system 122 preprocesses the video frames if necessary, for example, to select a portion of the video frame showing a bounding box around the traffic entity and provides the preprocessed video frame to the neural network 120 as input. The vehicle computing system 122 executes the neural network to generate outputs indicating values of hidden context attributes and uncertainty values associated with the predicted outputs. The vehicle computing system 122 uses the output of the neural network 120 to navigate the autonomous vehicle through the traffic. In an embodiment, the vehicle computing system 122 uses the output generated by the neural network to generate control signals provided to the controls of the vehicle, for example, braking system, accelerator, steering, and so on.

Figure 10:
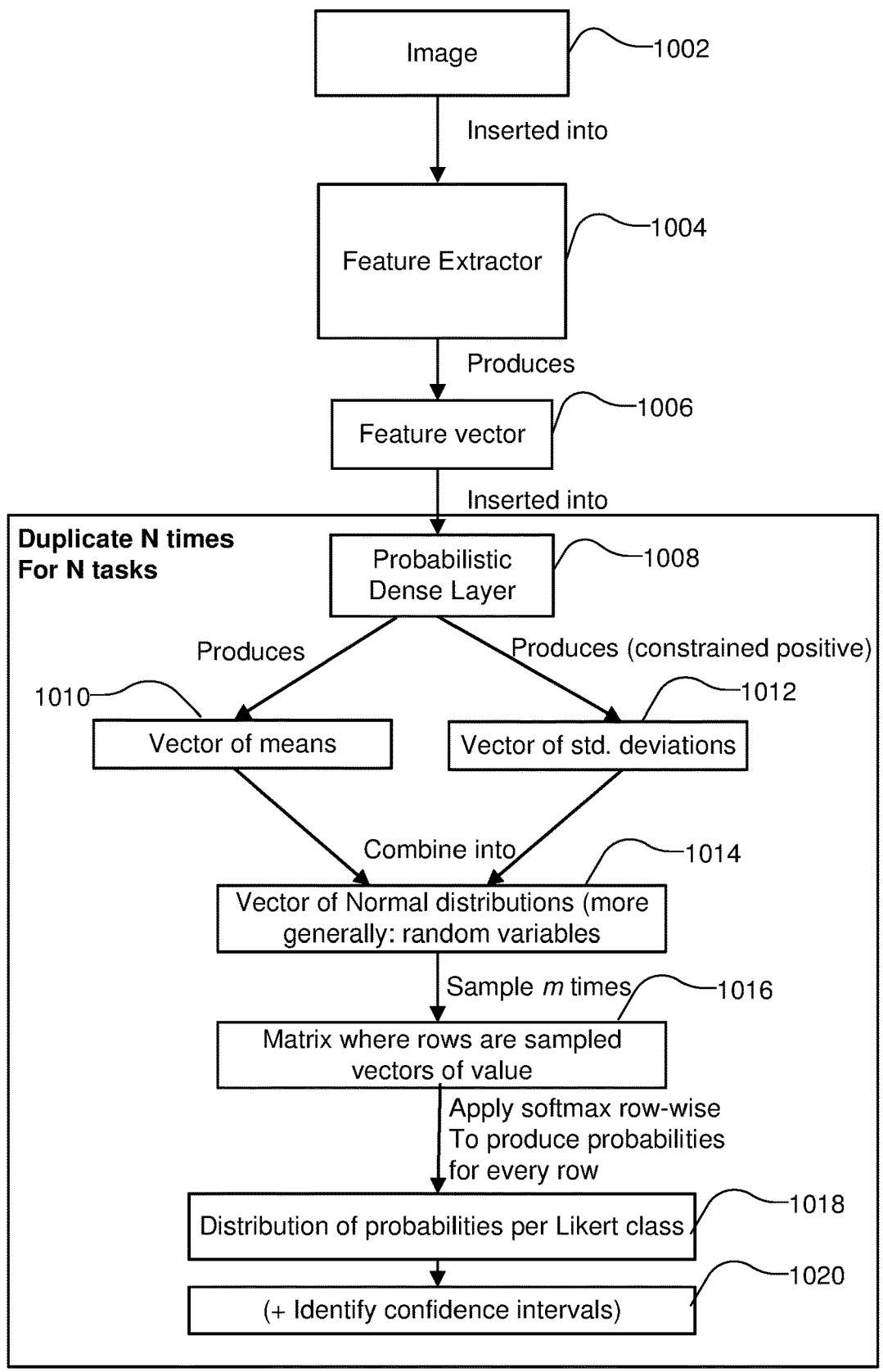
FIG. 10 represents a flowchart illustrating the process of generating training dataset for training of neural network illustrated in FIG. 2, according to another embodiment.

FIG. 10 represents a flowchart illustrating the process of generating training dataset for training of neural network illustrated in FIG. 2, according to another embodiment. The system receives an image 1002, for example, a video frame. The system inserts the image into a feature extractor 1004, for example, the feature extraction component 125. The feature extractor produces a feature vector 1006 that has a plurality of elements.

The neural network 120 repeats the following steps for N times of the neural network 120 is a multi-task neural network that produces outputs corresponding to N tasks. The feature vector is processed by a probabilistic dense layer 1008 of the neural network 120 (which may be part of the feature extraction component 125). The probabilistic dense layer 1008 of the neural network 120 produces a vector 1010 of mean values and a vector 1012 of deviation values. In other embodiments, the probabilistic dense layer 1008 may generate other types of statistical distribution parameters. In other embodiments, other parameters can be used depending on the type of random variable, for example, Normal, Laplace, Beta, Multinomial, Student-t, and so on.

The neural network 120 combines the vectors 1010 and 1012 to generate a vector 1014 of random variables, for example, a vector of normal distributions. The neural network 120 performs sampling from the vector of normal distributions to generate a matrix 1016 where each row represents a sampled vector of values. The neural network 120 applies softmax function on the rows to produce probability values for each row. The neural network uses the probability values to generate distribution 1018 of probabilities according to bins of outputs.

In some embodiments, the neural network 120 also identifies confidence intervals 1020 when the trained model is executed, i.e., during inference time, for example, during navigation of a vehicle. The confidence interval may not be determined during training of neural network 120. At inference time, the value of m>1, i.e., multiple samples are generated. Accordingly, per random variable, m samples are generated. For example, if there are 5 random variables, or 1 per output bin, the neural network 120 generates m probabilities per bin. With this collection of probabilities for one certain bin, the neural network 120 computes any percentile (since they are all estimates of the same number). For example, for a 95% confidence interval, the system takes the 2.5th and 97.5th percentiles for every individual bin.

Computing Machine Architecture

Figure 11:
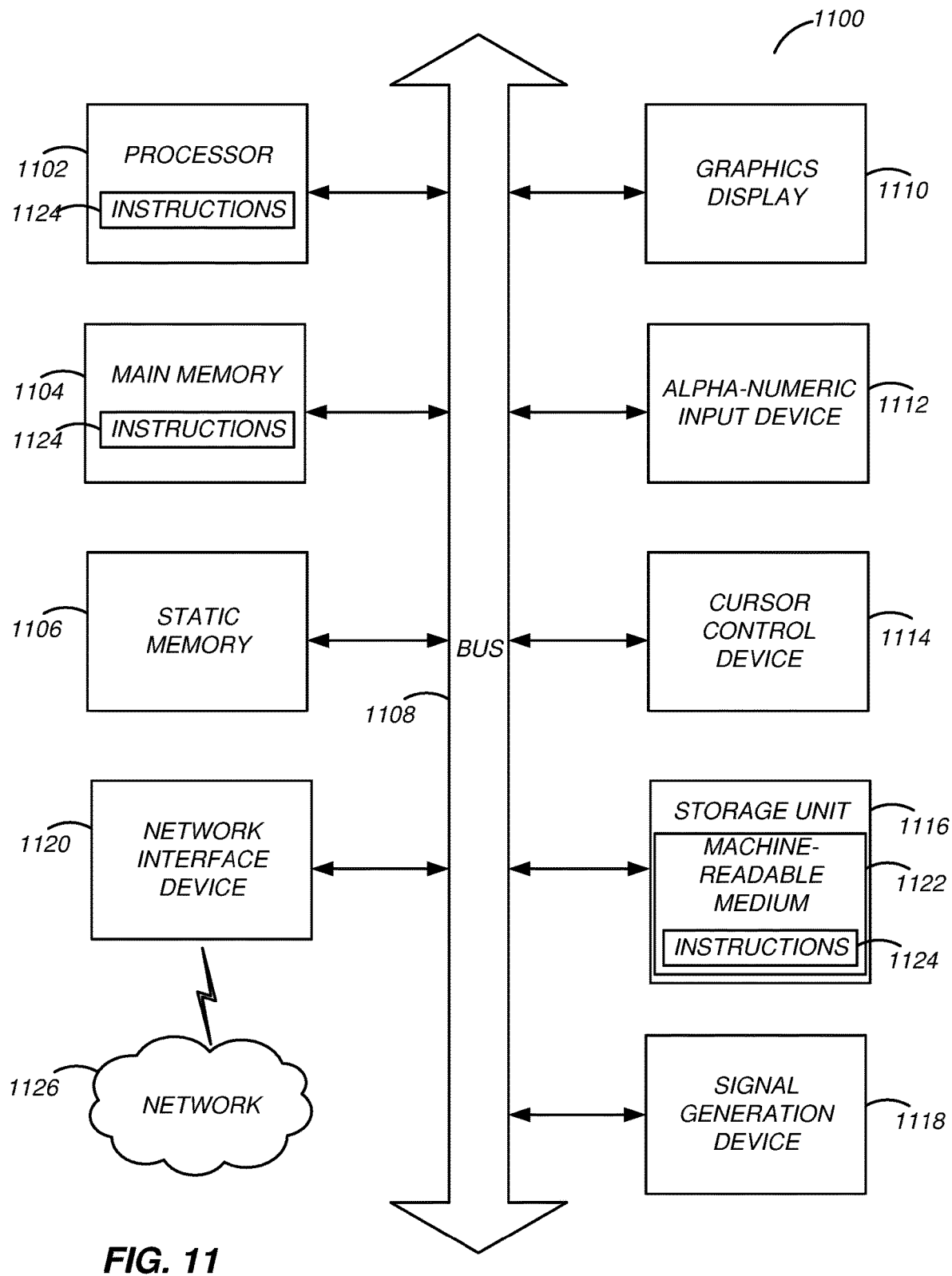
FIG. 11 is a block diagram illustrating components of an example machine able to read instructions from a machine-readable medium and execute them in a processor (or controller).

FIG. 11 is a block diagram illustrating components of an example machine able to read instructions from a machine-readable medium and execute them in a processor (or controller). Specifically, FIG. 11 shows a diagrammatic representation of a machine in the example form of a computer system 1100 within which instructions 1124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include graphics display unit 1110 (e.g., a plasma display panel (PDP), a liquid crystal display (LCD), a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

For every flowchart presented herein in the figures, the steps illustrated in the flowchart may be performed in an order different from that illustrated in the figure. For example, certain steps may be performed in parallel. The steps may be performed by modules other than those indicated herein.

Although embodiments disclosed describe techniques for navigating autonomous vehicles, the techniques disclosed are applicable to any mobile apparatus, for example, a robot, a delivery vehicle, a drone, and so on.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device) or in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A method for navigating autonomous vehicles, comprising:
   training a probabilistic neural network, the probabilistic neural network configured to perform steps comprising:
      receiving as input, an image of traffic, the image displaying a traffic entity belonging to the traffic,
      generating a feature vector for a plurality of features, the feature vector comprising values describing statistical distribution for each feature, and
      generating output representing hidden context for the traffic entity, the output comprising a plurality of values, each value representing a likelihood of receiving a particular user response from a user presented with the image;
   receiving a new image captured by a camera mounted on an autonomous vehicle navigating through traffic;
   executing the probabilistic neural network to generate output representing hidden context for at least a traffic entity displayed in the new image;
   determining a measure of uncertainty for each of the plurality of values; and
   navigating the autonomous vehicle to avoid the traffic entity displayed in the new image, the navigation based on at least the measure of uncertainty generated by the probabilistic neural network.

2. The method of claim 1, wherein the values describing statistical distribution for each feature comprise a mean value and a standard deviation for the feature.

3. The method of claim 1, wherein training the probabilistic neural network comprises determining evidence lower bound between the plurality of values predicted and a plurality of values determined from user responses obtained from users presented with images from a training dataset.

4. The method of claim 1, wherein determining the measure of uncertainty for each of the plurality of values comprises:
generating a plurality of samples for the input image using the probabilistic neural network; and
determining a confidence interval for each of the plurality of values using the plurality of samples.

5. The method of claim 1, wherein navigating the autonomous vehicle comprises ensuring that the autonomous vehicle stays at least a threshold distance away from the traffic entity displayed in the new image, the threshold distance determined based on the measure of uncertainty generated by the probabilistic neural network.

6. The method of claim 5, wherein the threshold distance is determined to be a value directly related to the measure of uncertainty generated by the probabilistic neural network.

7. The method of claim 1, wherein the hidden context represents a state of mind of a user represented by the traffic entity.

8. The method of claim 1, wherein the hidden context represents a task that a user represented by the traffic entity is planning on accomplishing.

9. The method of claim 1, wherein the hidden context represents a degree of awareness of the autonomous vehicle by a user represented by the traffic entity.

10. The method of claim 1, wherein the hidden context represents a goal of a user represented by the traffic entity, wherein the user expects to achieve the goal within a threshold time interval.

11. The method of claim 1, wherein navigating the autonomous vehicle comprises:
generating signals for controlling the autonomous vehicle based on motion parameters and the hidden context of the traffic entity; and
sending the generated signals to controls of the autonomous vehicle.

12. The method of claim 1, wherein the probabilistic neural network is a probabilistic convolutional neural network.

13. A non-transitory computer readable storage medium storing instructions, that when executed by a processor, cause the processor to perform steps comprising:
training a probabilistic neural network, the probabilistic neural network configured to perform steps comprising:
receiving as input, an image of traffic, the image displaying a traffic entity belonging to the traffic,
generating a feature vector for a plurality of features, the feature vector comprising values describing statistical distribution for each feature, and
generating output representing hidden context for the traffic entity, the output comprising a plurality of values, each value representing a likelihood of receiving a particular user response from a user presented with the image;
receiving a new image captured by a camera mounted on an autonomous vehicle navigating through traffic;
executing the probabilistic neural network to generate output representing hidden context for at least a traffic entity displayed in the new image;
determining a measure of uncertainty for each of the plurality of values; and
navigating the autonomous vehicle to avoid the traffic entity displayed in the new image, the navigation based on at least the measure of uncertainty generated by the probabilistic neural network.

14. The non-transitory computer readable storage medium of claim 13, wherein the values describing statistical distribution for each feature comprise a mean value and a standard deviation for the feature.

15. The non-transitory computer readable storage medium of claim 13, wherein training the probabilistic neural network comprises determining evidence lower bound between the plurality of values predicted and a plurality of values determined from user responses obtained from users presented with images from a training dataset.

16. The non-transitory computer readable storage medium of claim 13, wherein determining the measure of uncertainty for each of the plurality of values comprises:
generating a plurality of samples for the input image using the probabilistic neural network; and
determining a confidence interval for each of the plurality of values using the plurality of samples.

17. The non-transitory computer readable storage medium of claim 13, wherein navigating the autonomous vehicle comprises ensuring that the autonomous vehicle stays at least a threshold distance away from the traffic entity displayed in the new image, the threshold distance determined based on the measure of uncertainty generated by the probabilistic neural network.

18. The non-transitory computer readable storage medium of claim 17, wherein the threshold distance is determined to be a value directly related to the measure of uncertainty generated by the probabilistic neural network.

19. The non-transitory computer readable storage medium of claim 13, wherein navigating the autonomous vehicle comprises: generating signals for controlling the autonomous vehicle based on motion parameters and the hidden context of the traffic entity; and sending the generated signals to controls of the autonomous vehicle.

20. A computer system comprising:
a processor; and
a non-transitory computer readable storage medium storing instructions that when executed by the processor, cause the processor to perform steps comprising:
training a probabilistic neural network, the probabilistic neural network configured to perform steps comprising:
receiving as input, an image of traffic, the image displaying a traffic entity belonging to the traffic,
generating a feature vector for a plurality of features, the feature vector comprising values describing statistical distribution for each feature, and
generating output representing hidden context for the traffic entity, the output comprising a plurality of values, each value representing a likelihood of receiving a particular user response from a user presented with the image;
receiving a new image captured by a camera mounted on an autonomous vehicle navigating through traffic;
executing the probabilistic neural network to generate output representing hidden context for at least a traffic entity displayed in the new image;

determining a measure of uncertainty for each of the plurality of values; and navigating the autonomous vehicle to avoid the traffic entity displayed in the new image, the navigation based on at least the measure of uncertainty generated by the probabilistic neural network.

\* \* \* \* \*